A. M. CHASE.
GOVERNING MEANS FOR INTERNAL COMBUSTION ENGINES.
APPLICATION FILED APR. 24, 1911.
1,129,788. Patented Feb. 23, 1915.
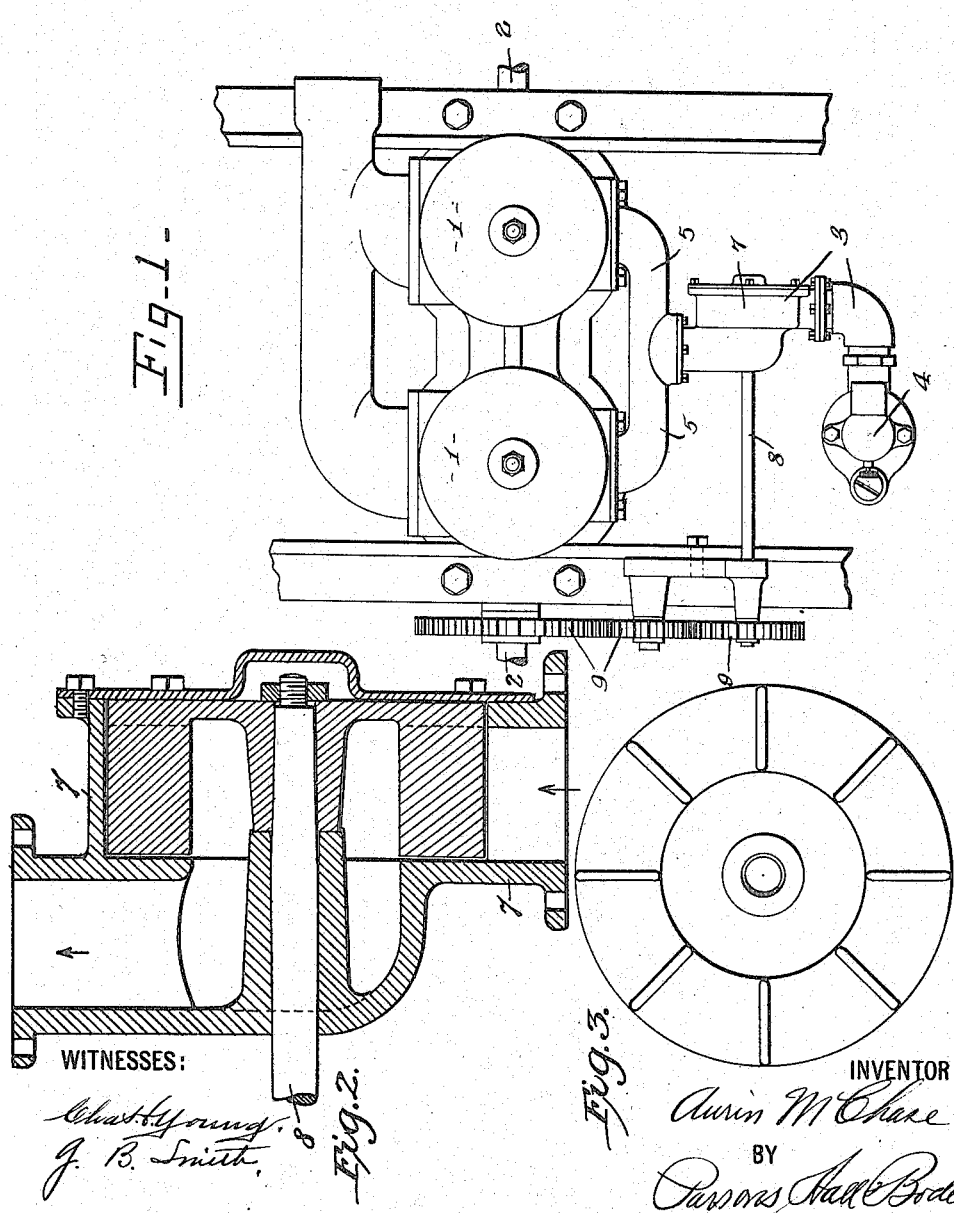

UNITED STATES PATENT OFFICE.

AURIN M. CHASE, OF SYRACUSE, NEW YORK.

GOVERNING MEANS FOR INTERNAL-COMBUSTION ENGINES.

1,129,788.  Specification of Letters Patent.  Patented Feb. 23, 1915.

Application filed April 24, 1911. Serial No. 622,886.

*To all whom it may concern:*

Be it known that I, AURIN M. CHASE, of Syracuse, in the county of Onondaga and State of New York, have invented a certain new and useful Governing Means for Internal-Combustion Engines, of which the following is a specification.

This invention has for its object the production of a particularly simple and efficient governing means for internal combustion engines; and it consists in the combinations and constructions hereinafter set forth and claimed.

In describing this invention reference is had to the accompanying drawing in which like characters designate corresponding parts in all the views.

Figure 1 is a plan of an internal combustion engine provided with one form of my invention. Fig. 2 is a sectional view through a portion of the governing means. Fig. 3 is a face view of the fan of said governing means.

1 designates the cylinders of an engine and 2 the crank shaft to which the reciprocating pistons in the cylinders are connected in the ordinary manner. 3 is an inlet conduit for the motive fluid, such conduit being connected to a vaporizer or carbureter 4 or any other form of motive fluid generator and having branches 5 connected respectively to the cylinders of the engine. However, if the engine is a single cylinder engine, the pipe 4 will be unprovided with branches and connected directly to the cylinder. All of the foregoing parts may be of any desirable form, size and construction and as the construction thereof forms no part of this invention further description is thought to be unnecessary.

This invention comprises means operated by the engine by which the flow of the motive fluid through the carbureter to the cylinders of the engine is automatically governed.

As here illustrated the governing means consists of a fan or blower located in a suitable casing 7 forming part of the inlet pipe 3, said casing being preferably located between the carbureter 4 and the cylinders 1 of the engine. The fan is connected to the crank shaft 2 of the engine by suitable power-transmitting connections here shown as the shaft 8 on which the fan is mounted and gears 9 connected to such shaft and the crank shaft of the engine. The fan is here shown as of the centrifugal type and operates to blow backwardly through the carbureter and retard the flow of motive fluid through the carbureter to the cylinders during the suction strokes of the pistons in the cylinders. When the engine is running slowly the action of the fan is of less effect in proportion to the speed of the mixture passing through the carbureter than when the engine is running at high speed so that as the speed of the engine increases, the retarding effect of the fan becomes proportionally greater.

What I claim is:—

1. The combination with an internal combustion engine having an inlet conduit for the motive fluid; of a vaporizer associated with said conduit, rotary means associated with said conduit and operated by the engine for retarding the flow of motive fluid through the vaporizer to the cylinder of the engine, and power transmitting means between a moving part of the engine and the rotary means, substantially as and for the purpose described.

2. The combination with an internal combustion engine having an inlet conduit for the motive fluid; of a vaporizer associated with said conduit, a fan in said conduit, and power-transmitting connections between the fan and the crank shaft of the engine, for rotating the fan in a direction to effect a pressure in opposition to the direction of feed of the motive fluid from the vaporizer, substantially as and for the purpose specified.

3. The combination with an internal combustion engine having an inlet conduit for the motive fluid; of a vaporizer associated with said conduit, a fan in said conduit, and connections between the fan and the crank shaft of the engine for actuating the fan and creating a draft in the opposite direction to the flow of gas through the vaporizer to the engine, substantially as and for the purpose set forth.

4. The combination with an internal combustion engine having an inlet conduit for the motive fluid; of a vaporizer associated with said conduit, means associated with the conduit and actuated by the engine, said means tending to create a back draft through the vaporizer, substantially as and for the purpose described.

5. The combination with an internal combustion engine having an inlet conduit for the motive fluid; of a vaporizer associated with said conduit, and movable means connected in the conduit between the vaporizer and the cylinder of the engine, said means being connected to the crank shaft of the engine and operable for retarding the flow of motive fluid through the vaporizer to the cylinder of the engine, substantially as and for the purpose specified.

6. The combination with an internal combustion engine having an inlet conduit for the motive fluid; of a vaporizer associated with said conduit, a casing connected in the conduit between the carbureter and the cylinder of the engine, a fan in the casing, and connections between the fan and the crank shaft of the engine for actuating the fan, the fan being arranged to create a back draft through the inlet conduit, substantially as and for the purpose set forth.

7. In an internal combustion engine, the combination with a cylinder, a piston and a feed pipe leading to the cylinder, of means for creating in said pipe a variable force acting in opposition to the suction created by the said piston.

In testimony whereof, I have hereunto signed my name in the presence of two attesting witnesses, at Syracuse, in the county of Onondaga, in the State of New York, this 25th day of March, 1911.

AURIN M. CHASE.

Witnesses:
G. B. SMITH,
S. DAVIS.